United States Patent [19]
Lewis et al.

[11] Patent Number: 5,460,388
[45] Date of Patent: Oct. 24, 1995

[54] ENDMILL ADAPTER WITH TORQUE REDUCING LOCKNUT AND COLLET INTERFACE

[75] Inventors: David L. Lewis; Victor D. Mogilnicki; Thomas J. Presby, all of Raleigh, N.C.

[73] Assignee: Kennametal Inc., Latrobe, Pa.

[21] Appl. No.: 191,231

[22] Filed: Feb. 3, 1994

[51] Int. Cl.⁶ ................................................ B23B 31/20
[52] U.S. Cl. ...................... 279/42; 279/48; 279/56; 409/234
[58] Field of Search ................ 279/42, 48, 56, 279/69, 20, 43.9, 46.9, 157; 409/232, 234; 408/239 R, 240

[56] References Cited

U.S. PATENT DOCUMENTS

| | | | |
|---|---|---|---|
| 78,916 | 6/1868 | Babcock . | |
| 508,667 | 11/1893 | Woeber . | |
| 811,722 | 2/1906 | Hoenscheid . | |
| 1,268,171 | 6/1918 | Spaulding . | |
| 1,702,810 | 2/1929 | Buhr . | |
| 2,193,615 | 3/1940 | Ashley | 279/49 |
| 2,380,330 | 7/1945 | Ringler | 279/42 |
| 2,577,556 | 12/1951 | Williams | 128/218 |
| 2,680,333 | 6/1954 | Calosi | 51/59 |
| 2,777,703 | 1/1957 | Pickett et al. | 279/56 |
| 2,842,020 | 7/1958 | Tarquinio | 81/177 |
| 3,727,928 | 4/1973 | Benjamin | 279/1 L |
| 3,817,648 | 6/1974 | Miller | 279/20 |
| 3,820,801 | 6/1974 | Lindler | 279/48 |
| 4,341,006 | 7/1982 | Staron | 29/434 |
| 4,421,443 | 12/1983 | Woythal et al. | 409/232 |
| 4,562,329 | 12/1985 | Minton | 219/99 |
| 4,699,388 | 10/1987 | Sproccati et al. | 279/48 |
| 4,725,064 | 2/1988 | Glimpel et al. | 279/47 |
| 5,234,296 | 8/1993 | Presby et al. | 409/234 |

FOREIGN PATENT DOCUMENTS

| | | |
|---|---|---|
| 3327046 | 2/1985 | Germany . |
| 3603301 | 8/1987 | Germany . |
| 4209485 | 1/1993 | Germany . |

OTHER PUBLICATIONS

"Selection of Collet Chuck Parameters", Machines & Tooling, vol. XLII, No. 9, 1971, pp. 14–19, M. L. Orlikov and Yu N. Kuznetsov.

*Primary Examiner*—Steven C. Bishop
*Attorney, Agent, or Firm*—James G. Porcelli

[57] ABSTRACT

A toolholder 1 of the type including a collet 5 integrally formed with a shank 3 is provided with an interface between a locknut 7 and collet 13 which substantially reduces the torque required to turn the locknut 7 into a position which radially collapses the collet segments 17. In this interface, one of either the inner locknut surface 23 or the outer surfaces of the collet segments 17 includes an engaging portion 56 for wedgingly flexing the collet segments 17 inwardly when the locknut is turned, and a non-engaging portion 58 disposed between the engaging portion 56 and the shank mounted ends of the collet segments 17. The non-engaging portion 58 reduces the torque required to turn the locknut 7 by reducing the binding forces that would otherwise occur between the ends of the collet segments 17 and the inner locknut surface 23. To further reduce torque, the collet portion interconnecting the collet segments 17 with the shank 3 of the toolholder is rendered thinner by the provision of circumferential grooves 72, 76 that make the collet segments 17 more flexible. Sealing rings 66, 74, 81 are seated in grooves 68, 72, 76 present in the interior defined by the collet segments 17 in order to prevent errant flows of coolant or debris from collecting between the collet segments 17 and the tool shank 9 gripped thereby.

22 Claims, 5 Drawing Sheets

ENDMILL ADAPTER WITH TORQUE REDUCING LOCKNUT AND COLLET INTERFACE

BACKGROUND OF THE INVENTION

This invention generally relates to toolholders, and is specifically concerned with an endmill adapter of the type having an integral collet that has been improved by the provision of a torque reducing locknut and collet interface.

An endmill is a generally cylindrical cutting tool which has a plurality of cutting edges around its outer periphery. The endmill usually includes a cylindrical shank which fits into an axial bore of a toolholder. For precision cutting operations, the endmill shank must be securely and concentrically mounted within the toolholder bore. To this end, various mechanisms have been developed for securing the endmill and the toolholder against axial movement and against rotation of the endmill with respect to the holder. One prior art securing mechanism employs a set screw threadedly engaged in the wall of the holder which is tightened against a flat formed on the shank of the endmill. Unfortunately, the radial set screw creates an imbalance in the holder which creates unwanted vibration and eccentric movements of the tool during use, particularly at high rotational speeds. Still another prior art securing mechanism has been the combination of a collet and chuck. A tapered collet having an axial bore for receiving the shank of the endmill is radially compressed by a locknut that is threadedly connected to the body of the toolholder. In theory, the collet collapses uniformly around its circumference so that the shank of the tool is accurately positioned at the center of the holder. A non-pullout wedge may be used in combination with the collet to prevent axial and rotational movement of the shank of the endmill relative to the interior of the collet. A collet and chuck arrangement of this type is disclosed in U.S. Pat. No. 4,341,006 to Starn. However, 10 the interfacing surfaces of the collet and chuck body require a substantial amount of accurate machining which translates into substantial manufacturing costs. Further, the cumulative tolerances between parts limit the degree of accuracy which can be obtained.

To overcome the shortcomings associated with the use of prior art set screw and collet and chuck mechanisms, engineers employed by Kennametal Inc. developed an endmill adapter having an integral collet described and claimed in U.S. Pat. No. 5,234,296 by Presby and Mogilnicki. The collapsible segments of the collet disclosed in the '296 patent are formed by cutting longitudinal slots into an integrally formed, frustro-conical skirt extending down from the tapered shank of the toolholder. The longitudinal slots do not extend all the way to the ends of the collet segments, which has the effect of forming a continuous tie ring that integrally joins the distal ends of all of the collet segments. The base of the resulting collet is then threaded for receiving the threaded interior of the locknut. The resulting collet is easy and inexpensive to manufacture, and the continuous tie ring that interconnects the distal ends of the collet segments provides greater rigidity at the outer end of the collet for improved accuracy. In use, a generally tubular locknut having a threaded inner diameter is screwed over the threads at the base of the collet for deflecting the collet segments radially inward to grip the shank of an endmill or tool.

While the endmill adapter disclosed and claimed in the '296 patent constitutes a substantial advance in the art, the inventors have noted several areas where this collet might be improved. For example, while the greater rigidity of the collet segments defined by the longitudinal cuts in the frustro-conical collet body does indeed improve the accuracy with which this device grips and centers the shank of an endmill, the resulting rigidity of the collet segments also increases the amount of torque necessary to turn the locknut to adequately radially deflect the segments into firm engagement with a tool shank. Additionally, as is the case with other prior art collet chuck mechanisms, it may be possible for errant sprays of coolant to enter the chuck mechanism and flow between the tool shank and the interior surface of the collet. The presence of liquid coolant between the interior surface of the collet and the tool shank secured therein is undesirable, as it can interfere with the desired frictional grip between these two components.

Clearly, what is needed is an improved endmill adapter of the type that utilizes an integral collet in which the locknut can be turned in order to radially compress the collet segments with only low or moderate amounts of torque to facilitate a quick and easy change of tools in the collet. Ideally, such an improved collet would further have a means for preventing errant flows of coolant from entering the space between the tool shank and the inner surface of the collet.

SUMMARY OF THE INVENTION

Generally speaking, the invention is an endmill adapter of the type having an integral collet which includes an improved, torque reducing locknut and collet interface, and sealing rings for preventing the entry of errant liquids and debris. In the torque reducing interface, one of either the inner locknut surface or the outer surfaces of the collet segments includes both an engaging portion for wedgingly flexing the collet segments inwardly when the locknut is turned, and a non-engaging portion in which the collet segments and locknut do not come into contact with one another for reducing the binding forces that the 10 applicants have observed are largely responsible for the torque required to turn the locknut. The non-engaging portion is disposed between the engaging portion and the shank mounted ends of the collet segments, and prevents binding from occurring between the outer surfaces of the shank mounted ends of the collet segments and the inner locknut surface.

In one embodiment of the invention, the engaging portion is formed on the outer surface of the collet segments by a centrally disposed portion that is raised with respect to the inner surface of the locknut, and the non-engaging portion may be formed by the presence of non-raised, frustro-conical surfaces on either side of the centrally raised portion. The centrally disposed, raised portion may be a frustro-conical surface which is inclined at the same angle as the frustro-conical interior of the locknut, while the non-engaging portions may be formed from frustro-conical surfaces inclined at an angle greater than and less than the inclination of the surface of the locknut. Preferably, the central engaging portion of each collet segment is inclined at an angle of approximately 4° with respect to the axis of rotation, which is the same angle of inclination as the inner surface of the locknut, while the non-engaging portions are inclined at angles of 4½° and 3½°, respectively.

In another embodiment of the invention, the outer surface of each of the collet segments is arcuate in cross-section such that the middle of the arcuate section forms the engaging portion, while the rounded sides of the section form non-engaging portions.

In a third embodiment of the invention, the inner surface of the locknut defines the engaging and non-engaging portions, rather than the outer surfaces of the collet segments. In this embodiment, while both the inner surfaces of the locknut and outer surfaces of the collet segments are frustro-conical and inclined at the same angle, the engaging and non-engaging portions are defined by a plurality of broad grooves that circumscribe the inner diameter of the locknut. The grooves define two centrally disposed lands which form the engaging portions of the interface, as well as three non-engaging portions, one of which is disposed between the lands and the shank mounted ends of the collet segments.

In all three embodiments, the presence of a non-engaging portion in the area between the outer surfaces of the shank mounted ends of the collet segments and the inner locknut surface advantageously reduces the amount of torque needed to turn the locknut into a position that radially collapses the collet segments around a tool shank by eliminating frictional binding forces which otherwise would occur in this area.

To further reduce the torque needed to turn the locknut, the invention may also include two pairs of grooves that circumscribe both the shank mounted ends of the collet segments and the opposite ends of these segments. The presence of these grooves reduces the amount of force necessary to radially flex the segments inwardly.

Finally, in order to prevent the entry of errant coolant between the inner surfaces of the collet segments and the shank of a tool, a pair of circular sealing elements may be seated within grooves present in the inner diameter of the collet at either end of the collet segments. The grooves in which these annular gaskets are seated may also be the same grooves used to lower the amount of force necessary to radially flex the collet segments inwardly.

BRIEF DESCRIPTION OF THE SEVERAL FIGURES

DETAILED DESCRIPTION OF THE PREFERRED EMBODIMENT

Figure 1:
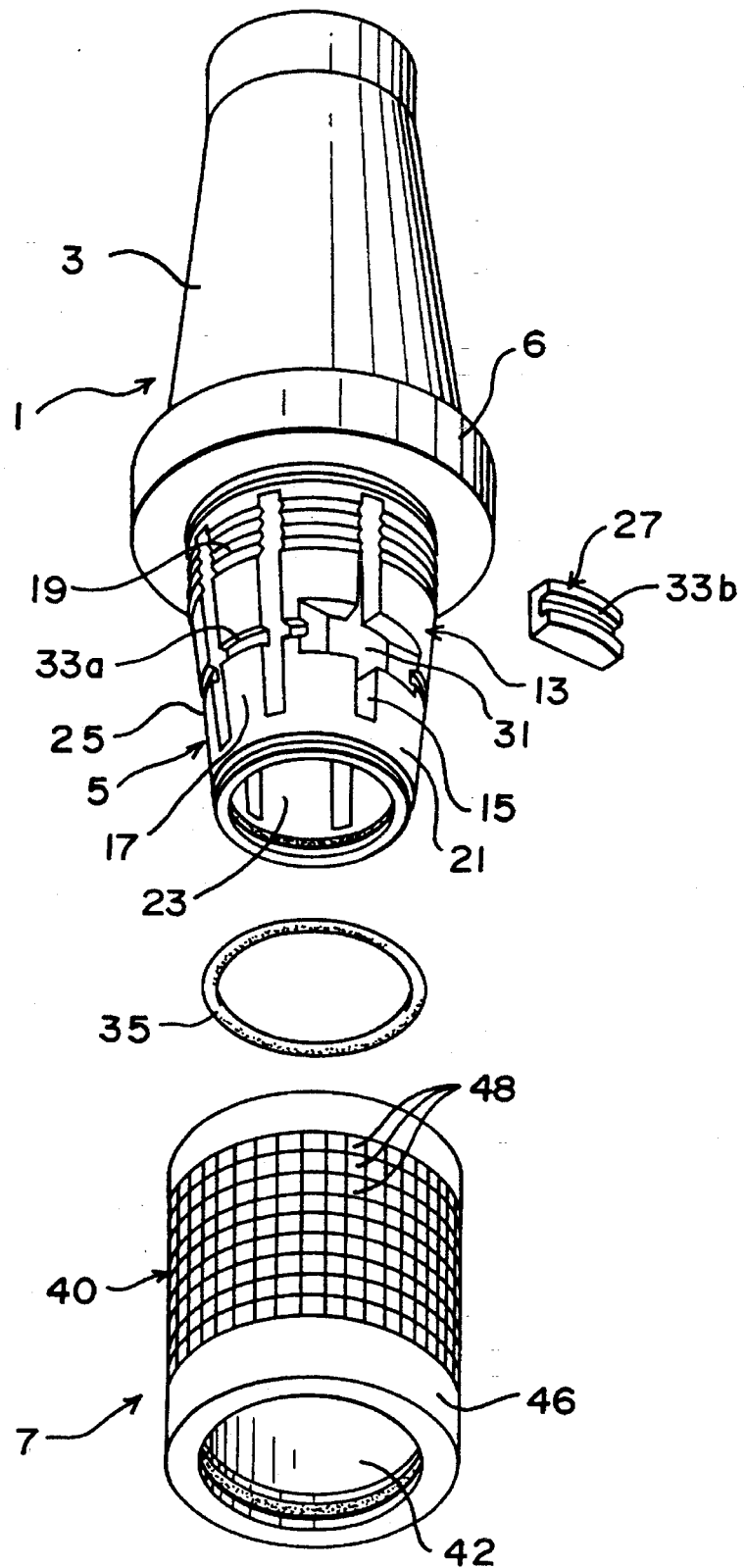
FIG. 1 is an exploded perspective view of the endmill adapter of the present invention.

With reference now to Figures i and 2, wherein like numerals designate like components throughout all the several figures, the endmill adapter 1 of the invention includes a tapered shank 3 on its upper end, and a collet 5 on its lower end. The tapered shank 3 may be mounted on either the rotating spindle of a milling or drilling machine or the non-rotating turret of a turning type machine (not shown). A flange 6 separates the tapered shank 3 from the collet 5. The upper end of the collet 5 is integrally connected to the bottom end of the flange 6. A generally tubular locknut 7 circumscribes the outer surface of the collet 5.

In operation, the shank 9 of a tool such as an endmill is disposed into the interior of the collet 5, and the locknut 7 is axially screwed over the collet 5 of the adapter 1 in order to radially compress the segments of the collet 5 into tight frictional engagement against the tool shank 9. As a general guideline, unless specifically stated as tool shank 9, all references to shank will be directed toward the tapered shank 3 of the endmill adapter. Additionally, while an endmill adapter is discussed herein, it should be appreciated that the collet assembly could be applied to any toolholder used to secure a tool shank.

The collet 5 has a frustro-conical, skirt-shaped body 13 having a plurality of longitudinal slots 15 uniformly spaced around its exterior. These slots 15 form resilient collet segments 17 which are radially resilient with respect to the axis of rotation of the endmill adapter 1. Screw threads 19 circumscribe the shank mounted ends of each of the resilient collet segments 17 as shown. The opposite ends of the collet segments 17 are integrally connected by means of a continuous tie ring 21 formed by stopping the slots 15 short of the distal end of the collet body 13. The inner surface 23 of the collet has the same cylindrical shape as the tool shank 9 which it receives, while its outer surface 25 has a frustro-conical profile which is partially complementary in shape to the inner surface of the locknut 7 for a purpose that will be described presently.

Figure 2:
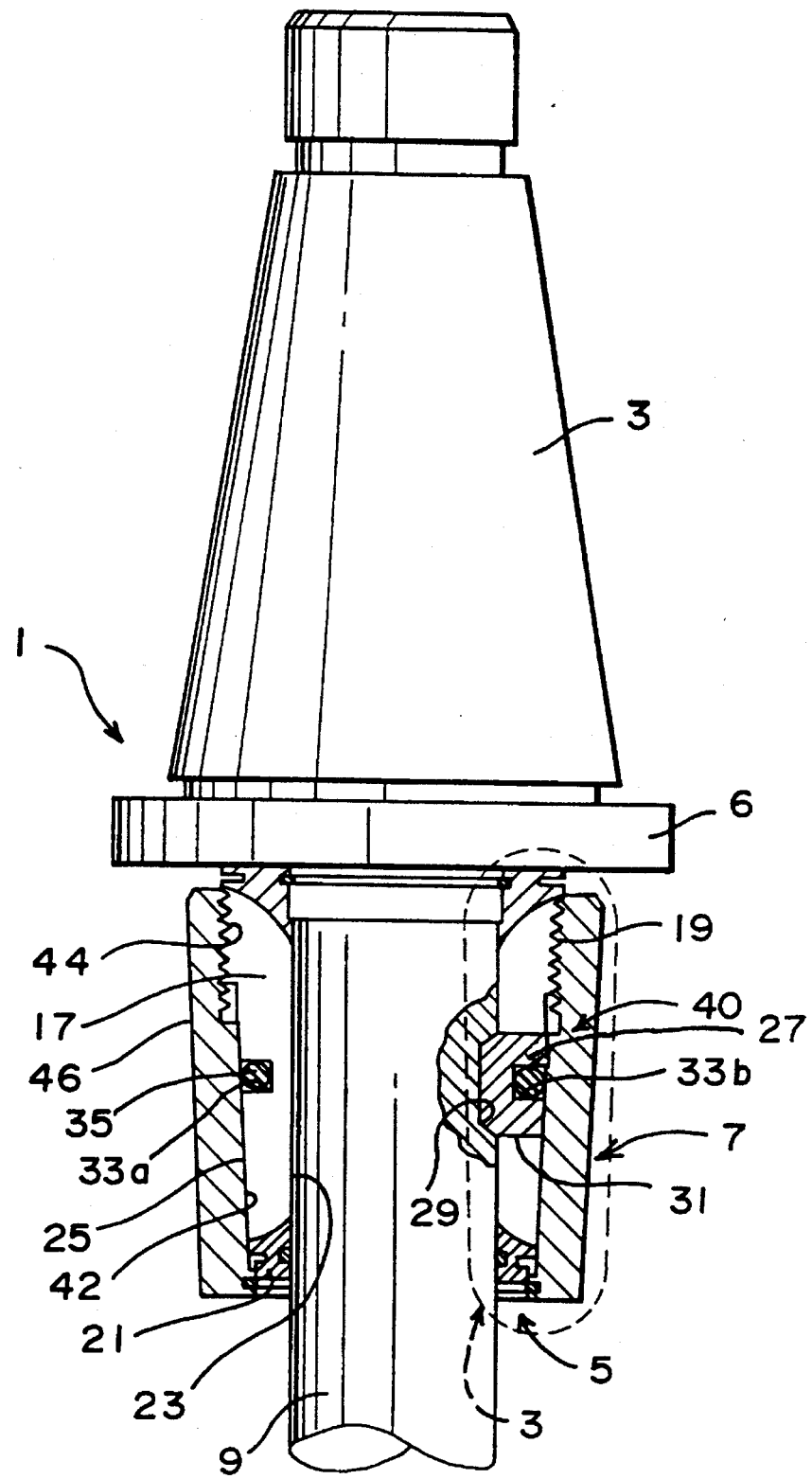
FIG. 2 is a cross-sectional side view of the endmill adapter, illustrating how the locknut functions to radially compress the collet segments around the shank of an endmill.

With specific reference to FIG. 2, the endmill adapter 1 further includes a non-pullout wedge 27 that is receivable within a complementarily-shaped notch 29 in the endmill shank 9. A wedge aperture 31 is provided through a pair of adjacent collet segments 17 for allowing the insertion of the wedge 27 through the collet body 13 to contact the tool shank 9. A groove 33a circumscribes the outer surfaces of the collets at the same latitude as the wedge aperture 31. A groove 33b is further provided on the outer surface of the wedge aperture 31 which aligns itself with the groove 33a in the collet segments 17 when the wedge is inserted through the aperture 31 and the notch 29 in the tool shank 9. The grooves 33a, b receive an elastic O-ring 35 which maintains the wedge 27 in position when the locknut 7 is to be reunited with the collet 5 incident to a tool changing operation.

The locknut 7 has a generally tubular body 40 with a generally frustro-conical interior 42. The proximal end of the interior 42 includes a plurality of screw threads 44 which are engagable with the screw threads 19 that circumscribe the shank-mounted ends of the collet segments 17. The exterior 46 of the locknut 7 is also preferably frustro-conically shaped. While the exterior 46 could just as easily be cylindrical in shape, the incorporation of a frustro-conical shape to the exterior 46 saves materials and reduces the overall weight of the locknut 7. In the preferred embodiment, a plurality of indentations 48 are provided around the exterior 46 in order to facilitate the firm manual grip of the locknut 7 by a machine operator.

Figure 3:
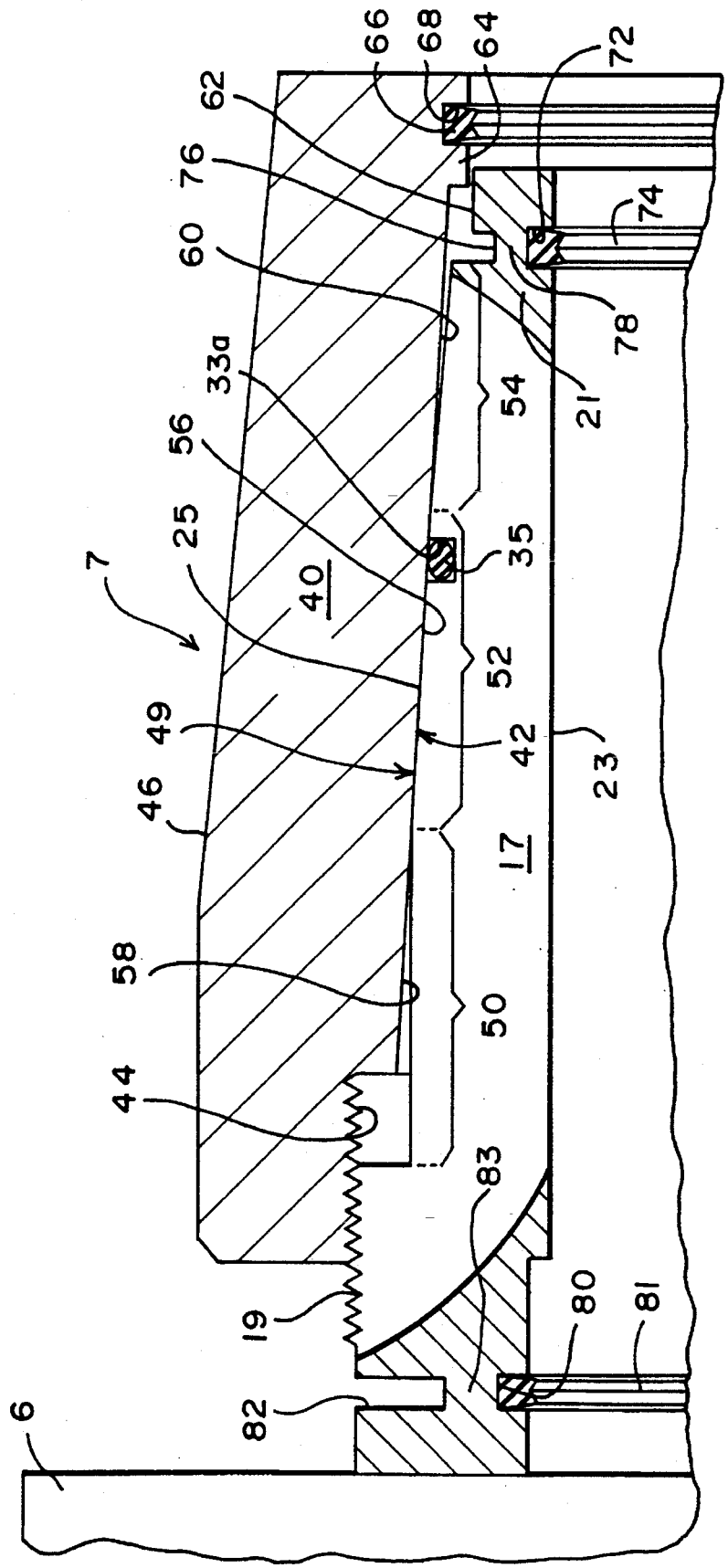
FIG. 3 is an enlargement of the interface between the locknut and the collet segments contained within the dotted ellipse in FIG. 2, shown without the tool shank or non-pullout wedge for simplification.

The interface between the collet 5 and the locknut 7 in the first embodiment of the invention is illustrated in FIG. 3. In the interface of this embodiment, each of the collet segments 17 includes a stepped outer surface 49 including a proximal angular section 50, a central angular section 52 and a distal angular section 54. Each of the angular sections 50, 52, and 54 have surfaces which are frustro-conical. The surfaces of the angular sections 50, 52, and 54 are inclined approximately 4½°, 4°, and 3½° to the axis of rotation of the endmill adapter 1, respectively. The central angular section 52 forms an engaging portion 56 between the collet 5 and locknut 7, while the proximal and distal angular sections 50 and 54 form proximal and distal non-engaging portions 58 and 60 which do not come into contact with the frustro-conical interior 42 of the locknut 7. The provision of a proximal non-engaging portion 58 between the engaging portion 56 and the proximal, shank mounted ends of the collet segments 17 prevents the generation of binding forces from occurring in this area which would greatly increase the amount of torque necessary to twist the locknut 7 in order to radially compress the collet segments 17 into tight engagement around the shank. Preferably, the engaging portion 56 of the collet 5 extends across a middle portion 52 of each of the collet segments 17 a length of about 20 to 85% of the length of the entire outer collet surface for all portions 50, 52, 54.

An annular clearance recess 62 is provided on the outer surface of the distal end of the integral collet 5. This recess 62 fits within an annular shoulder 64 located around the inner diameter of the distal end of locknut 7 when the locknut 7 is axially screwed toward the shank 3 of the adapter 1. To prevent errant coolant flows and other debris from entering the space between the interior surface 42 of the locknut 7 and the stepped outer surface 49 of the collet segments 17, an annular sealing ring 66 is provided. Ring 66 is seated in an annular groove 68 circumscribing the shoulder 64. While the sealing ring 66 does not engage the surface of the annular clearance recess 62 when the locknut 7 is in the position illustrated in FIG. 3, a sealing engagement between these two components is made when the locknut 7 is axially screwed toward the shank 3 to the extent necessary to tightly compress the collet segments 17 around the shank of a tool.

The inner diameter of the tie ring 21 of the collet 5 also includes an annular groove 72 which not only seats a distal annular sealing ring 74, but which further serves, in combination with a circumferential cut 76, to define a distal thin section 78 which advantageously renders the collet segments 17 more flexible. This same structure is duplicated at the proximal end of the collet 5. Specifically, a groove 80 is provided around the inner diameter of the proximal, shank mounted ends of the collet segments 17. This groove 80 not only seats a proximal annular sealing ring 81, but also functions in combination with a circumferential cut 82 to define a proximal thin section 83 which, like the distal thin section 78, renders the collet segments 17 more flexible. The distal and proximal annular sealing rings 74 and 81 prevent errant coolant or other debris from entering the space between the inner surface 23 of the collet 5 and the outer surface of any tool shank disposed therein. Additionally, the formation of distal and proximal thin sections 78 and 83 further advantageously reduce the amount of torque necessary to turn the locknut 7 to the axial extent necessary to radially collapse the collet segment 17 in tight engagement around the tool shank.

Figure 4:
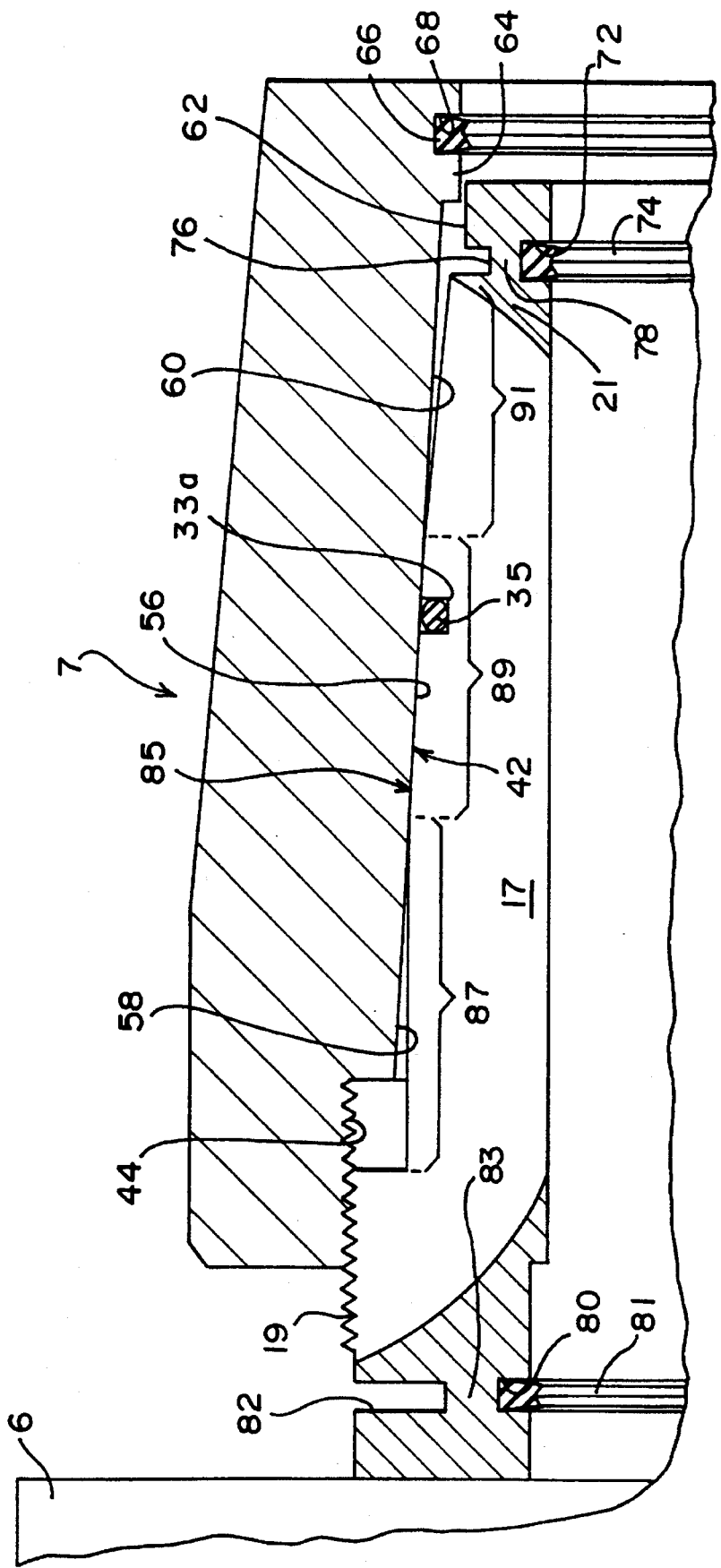
FIG. 4 is an enlarged, cross-sectional side view of the interface between the locknut and collet segments in a second embodiment of the invention.

FIG. 4 illustrates the interface between the collet 5 and the locknut 7 in the second embodiment of the invention. In the interface of this embodiment, each of the collet segments 17 includes a crowned outer surface 85 having an arcuate profile. The crowned outer surface 85 includes a proximal non-engaging portion 87, a central engaging portion 89, and a distal non-engaging portion 91. As was the case with the first described embodiment, the crowned outer surface 85 defines an engaging portion 56 which is flanked by a proximal non-engaging portion 58 and a distal non-engaging portion 60. The profile of the crowned outer surface 85 needs only to be curved enough to cause a surface-to-surface, venticular-type contact is made between the central engaging portion 89 of each of the collet segments 17 and the surface of the interior 42 of the locknut 7.

Figure 5:
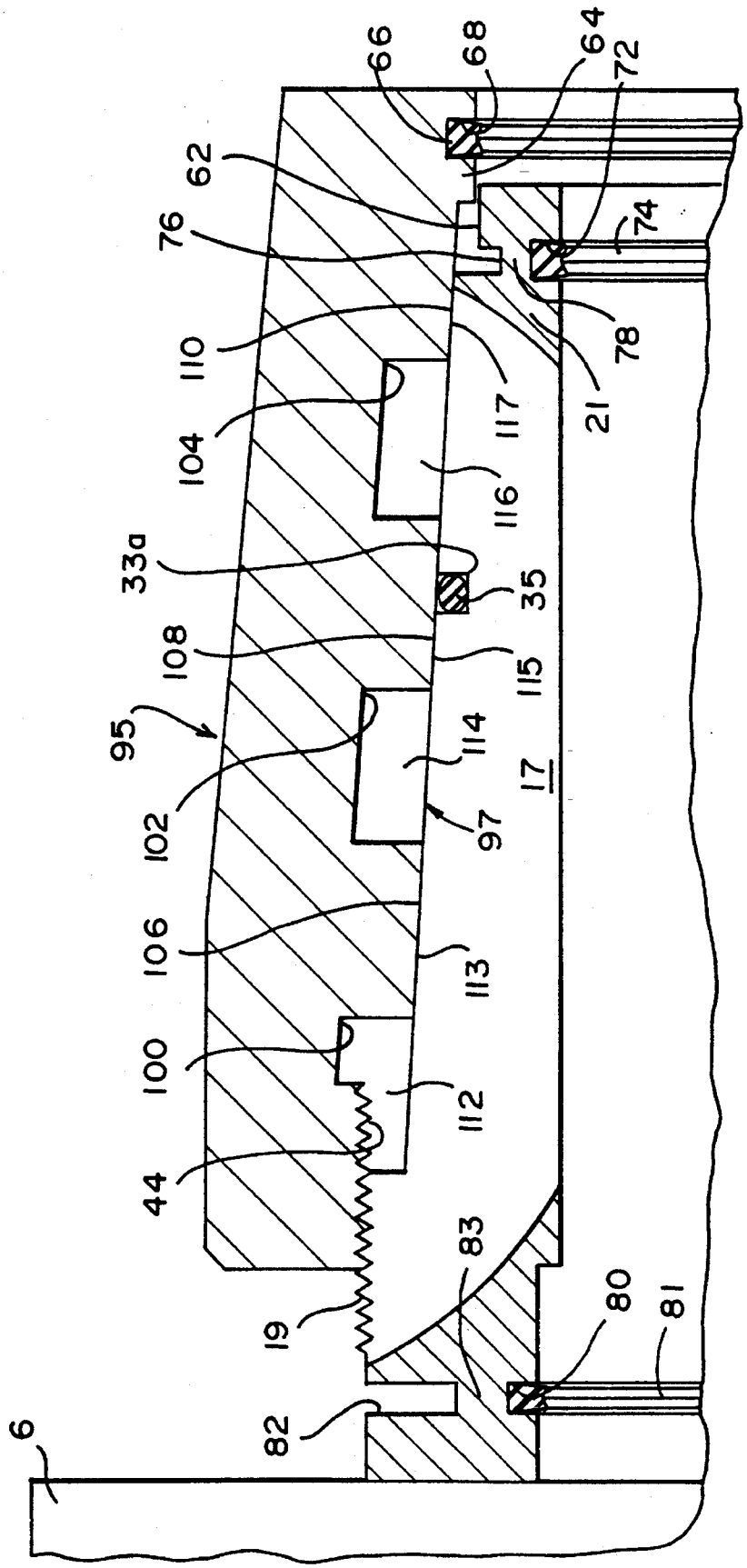
FIG. 5 is an enlarged, cross-sectional view of the interface between the locknut and collet segments in a third embodiment of the invention.

FIG. 5 illustrates the interface between the collet 5 and a modified locknut 95 in the third embodiment of the invention. In this embodiment, the engaging and non-engaging portions between the adjacent surfaces of the modified locknut 95 and the collet segments 17 are created in the inner surface of the locknut 95, instead of the outer surface of each of the segments 17. Specifically, proximal, central, and distal circumferential grooves 100, 102, and 104 are provided around the inner diameter of the locknut 95 in the positions shown. These grooves in turn define proximal, central, and distal lands 106, 108, and 110 respectively.

Preferably, the axial length of the proximal circumferential groove 100 is at least at 5% of the axial length of the locknut 95 to prevent the previously defined binding forces from occurring between the proximal ends of the collet segments 17 and the inner surface of the locknut 95 when it is axially screwed toward the shank 3 of the endmill 1. The grooves and lands define a proximal non-engaging portion 112, a proximal engaging 113, a central non-engaging portion 114, a central engaging portion 115, a distal non-engaging portion 116, and a distal engaging portion 117. The provision of the engaging and non-engaging portions illustrated in FIG. 5 has been found by the applicants to substantially reduce the amount of torque required to screw the modified locknut 95 into a position which firmly radially collapses the collet segment 7 around the shank of an endmill or other tool.

Certain modifications, variations, and additions to the invention will become evident to those having skill in the art. All such modifications, additions, and variations are intended to be encompassed within the scope of this invention, which is limited only by the claims appended hereto.

What is claimed is:

1. A toolholder for receiving and holding a tool, comprising
  (a) a rotatable shank for mounting the holder onto a turning machine;
  (b) a collet, including a plurality of resilient collet segments having a proximal end mounted on one end of said shank, and a distal end opposite said proximal end, each segment having an outer surface, and an inner surface for grippingly engaging a tool, and
  (c) a locknut having an inner surface circumscribing the outer surfaces of the collet segments, wherein one of said inner locknut surface and said outer surfaces of said collet segments includes an engaging portion for wedgingly engaging and inwardly radially flexing a middle section of said collet segments between said proximal and distal ends of said segments when said locknut is axially advanced in the direction of said rotatable shank, and a non-engaging portion means disposed between said engaging portion and said proximal shank mounted ends for reducing binding forces occurring between the outer surfaces of said proximal, shank mounted ends of said collet segments and said inner locknut surface.

2. A toolholder as defined in claim 1, wherein the outer surfaces of each of said collet segments includes a single engaging portion disposed in said middle section of each segment.

3. A toolholder as defined in claim 2, wherein the inner surface of said lockout is frustro-conical with respect to the axis of rotation of the rotatable shank, and wherein said engaging portion of each collet segment is tapered at an angle that is substantially complementary to the angle of the frustro-concial locknut surface.

4. A toolholder as defined in claim 3, wherein the engaging portion of each of said collet segments is flanked by a second non-engaging portion disposed between said middle section and said distal end of each segment.

5. A toolholder defined in claim 4, wherein the engaging portion extends across a middle section of each of the collet segments between about 20 and 85% of the length of the outer collet surface along the axis of rotation.

6. A toolholder as defined in claim 3, wherein the outer surface of each of said collet segments is arcuate in cross-section such that the middle of the arcuate section forms said engaging portion while the sides of said arcuate section form non-engaging portions.

7. A toolholder as defined in claim 1, wherein the outer surface of each of said collet segments is tapered, and wherein the inner surface of said locknut includes said engaging portion, and wherein said non-engaging portion is formed by a groove disposed between said engaging portion of said locknut and the proximal shank mounted ends of said collet segments.

8. A toolholder as defined in claim 7, wherein the length of said groove is at least 7% of the length of the inner surface of the locknut with respect to the axis of rotation of the rotatable shank.

9. A toolholder as defined in claim 7, wherein said non-engaging portion is formed from a plurality of grooves circumscribing the inner surface of the locknut, and wherein said engaging portion is formed by a plurality of lands defined between said grooves.

10. A toolholder as defined in claim 1, further comprising circumferential cuts across the shank mounted ends of each of said collet segments for rendering said segments more compliant to radial deflection by said locknut.

11. A toolholder for receiving and holding a tool, comprising:

(a) a rotatable shank for mounting the holder onto a rotating spindle or a non-rotating turret of a turning machine;

(b) a collet including a plurality of resilient collet segments, each of which has one proximal end integrally mounted on one end of said shank, a distal opposing end, an outer surface, and an inner surface for grippingly engaging a tool, said collet further including a tie ring for mutually interconnecting the distal opposing ends of said collet segments, and (c) a locknut having an inner surface circumscribing the outer surfaces of the collet segments, wherein one of said inner locknut surface and said outer surfaces of said collet segments includes an engaging portion for wedgingly engaging and radially inwardly flexing a middle section of said collet segments located between said proximal and distal ends of said segments when said locknut is axially advanced in the direction of said rotatable shank, and a non-engaging portion means disposed between said engaging portion and said proximal integrally mounted ends of said collet segments for reducing binding forces between the inner surface of the locknut and the outer surfaces of the integrally mounted ends of the collet segments when said locknut is axially advanced.

12. A toolholder as defined in claim 11, wherein said engaging portion is formed by a centrally disposed raised surface portion on each of said collet segments, and said non-engaging portion is formed by non-raised surface portions present on either side of said raised surface portion.

13. A toolholder as defined in claim 12, wherein the length of said raised surface portion is between 20 and 85% of the length of the collet segments.

14. A toolholder as defined in claim 11, wherein said inner surface of said locknut is frustro-conical, and the centrally disposed raised surface portion of each of said collet segments is tapered at an angle complementary to the angle of said frustro-conical inner locknut surface with respect to the axis of rotation of said shank.

15. A toolholder as defined in claim 11, wherein the outer surface of each of said collet segments is arcuate in cross-section such that the middle of the arcuate section forms said engaging portion while the sides of said arcuate section forms non-engaging portions.

16. A toolholder as defined in claim 11, wherein the outer surface of each of said collet segments is tapered, and wherein the inner surface of said locknut includes said engaging portion, and said non-engaging portion is formed by a groove disposed between said engaging portion of said locknut and the proximal, shank mounted ends of the collet segments.

17. A toolholder as defined in claim 16, wherein the length of the groove is at least 7% of the length of the inner surface of the locknut with respect to the axis of rotation of the rotatable shank, and further including a second and a third groove circumscribing the inner surface of the locknut, wherein said engaging portion is formed by a plurality of lands defined between said first, second, and third grooves.

18. A toolholder as defined in claim 11, further comprising a circumferential cut across the proximal, shank mounted end of each collet segment and the distal opposing ends of each of the collet segments for rendering said segments more compliant to radial deflection by said locknut.

19. A toolholder as defined in claim 11, further comprising a circumferential sealing ring disposed between the outer surfaces of the collet segments on the distal opposing ends of said segments and the inner surface of said locknut for obstructing the entry of dirt and debris between said locknut and said collet segments.

20. A toolholder as defined in claim 11, further comprising at least one sealing ring circumscribing the inner surfaces of the collet segments for effecting a fluid tight seal between a tool shank disposed within the collet, and the inner surfaces of the collet segments.

21. An endmill adapter for holding an endmill, comprising (a) a rotatable shank for mounting the endmill onto a turning machine;

(b) a collet including a plurality of resilient collet segments, each of which has a proximal end integrally mounted on one end of the shank, a distal opposing end, an outer surface, and an inner surface for grippingly engaging a tool;

(c) a locknut having an inner surface circumscribing the outer surfaces of the collet segments, wherein each of the collet segments has a raised portion on its outer surface located between its proximal and distal ends for wedgingly engaging the inner surface of the locknut when said locknut is axially advanced toward said shank to radially flex said collet segments inwardly, and a non-engaging portion formed from an unraised portion disposed between said raised portion and the proximal, shank mounted ends of the collet segments for reducing binding forces between the inner surface of the locknut and the outer surfaces of the proximal shank mounted ends of the collet segments, said raised portion being centrally disposed on the outer surfaces of each of the collet segments and covering approximately 50% of the length of each segment with respect to the axis of rotation of said shank.

22. An endmill adapter for holding an endmill, comprising (a) a rotatable shank for mounting the endmill onto a turning machine;

(b) a collet including a plurality of resilient collet segments, each of which has a proximal end integrally mounted on one end of said shank, a distal opposing end, an outer surface, and an inner surface for grippingly engaging a tool, and (c) a locknut having an inner surface circumscribing the outer surfaces of the collet segments, wherein a central portion of the inner surface of the locknut includes an engaging portion that is tapered with respect to the outer surfaces of the collet segments for wedgingly engaging and radially flexing said collet segments inwardly when said locknut is axially advanced in the direction of said rotatable shank, and a non-engaging portion formed from a groove between said engaging portion and said proximal shank mounted ends of the collet for reducing binding forces by preventing the engaging portion of said inner surface of the locknut from directly engaging the outer surfaces of the proximal shank mounted ends of the collet segments.

* * * * *